3,549,463
UNIVERSAL GRAPHIC DISPLAY MATERIAL HAVING AN EMBOSSED POLYVINYL FLUORIDE SURFACE LAYER
Everett Bryant Frech, Charlotte, N.C., assignor to Riegel Paper Corporation, New York, N.Y., a corporation of Delaware
No Drawing. Filed June 21, 1968, Ser. No. 738,780
Int. Cl. B43l 1/12; G03b 21/60; B32b 3/30
U.S. Cl. 161—2                                       10 Claims

ABSTRACT OF THE DISCLOSURE

A durable graphic display material suitable for displaying written, projected, and three dimensional subject matter is disclosed. The new material includes a lenticularly embossed polyvinyl fluoride film outer surface bonded to a layer of laminating grade white vinyl plastic. The new display material also includes a ferrous component for attracting and holding magnetized articles such as display markers used for illustrative purposes.

BACKGROUND OF THE INVENTION

Surfaces for the display of graphic information to an audience in the form of handwriting, optically projected images or supported three dimensional illustrative markers have been made in a wide variety of shapes and sizes and from many different materials. For the rapid display of chalk inscribed graphic information to an assembled group of people, the dark-colored slate "blackboard" has been very widely used for many years. For the projection of images onto a large surface for viewing by many people simultaneously, such as in the projection of photographic slides and motion pictures, various light-colored screens with glass beaded and lenticular surfaces are used. To display three dimensional markers on a vertical surface, magnetized boards have been employed in conjunction with ferrous markers, or vice versa.

In instructional applications, it is very common for a variety of graphic techniques to be alternatively and successively used. This usually requires the provision of a separate surface for use with each graphic technique. As will be appreciated, the provision of a plurality of different display surfaces is time and space consuming, as well as being relatively expensive compared to the use of a universal surface for all of the aforementioned graphic applications. This invention provides an improved universal display material that may be used for either written, projected or three dimensional graphic illustration, or any combination thereof, if desired.

SUMMARY OF THE INVENTION

The new material of the invention provides a white handwriting or drawing surface that is very durable, glare free and receptive of inked writing thereon. Additionally, the surface of the new material displays projected images, such as slides and movies, with clarity and sharpness. Moreover, the new and improved material of the invention includes a magnetizable component, for attracting and holding magnetized markers to its surface.

In accordance with the invention, the new graphic display material comprises a protective outer layer of a clear polyvinyl fluoride film. This outer film layer is laminated to a white laminating grade vinyl plastic substrate.

The polyvinyl fluoride surface of the new and improved laminate is very durable and should last indefinitely when used in the contemplated applications. The polyvinyl fluoride surface has very good writing and erasure characteristics, being particularly receptive of water based inks applied with felt pens. Water based inks can be easily erased from the surface of the new material, when desired, by the use of a damp cloth. Other writing materials, both temporary and permanent, can, of course, be used on the new display material.

In accordance with a significant aspect of the invention, the polyvinyl fluoride vinyl laminate is embossed with a uniform lenticular pattern to improve the writability, ink receptivity, and optical characteristics of the polyvinyl fluoride surface. This particular embossing pattern provides a nonglare writing and projection surface which eliminates so-called optical "hot spots," which otherwise might be present on the flat display surface of the new material.

For maximum versatility, the polyvinyl fluoride-vinyl laminate of the invention further includes a ferrous component whereby magnetized markers may be retained on the surface thereof. The ferrous component is most advantageously incorporated into the laminate in the form of a steel foil bonded to a surface of the vinyl component, or can be incorporated in the vinyl layer by using for the vinyl layer a material known as "magnetic vinyl," as made available by the Goodyear Chemical Company.

The new and improved display-projection material of the invention may be readily manufactured from discrete webs in roll form and the finished material may be either flexible or rigid. For its typical end uses, such as a projection screen for drive-in movies or in school classrooms, the new display material is bonded to a rigid support. To this end, the rear surface of the new material may also be provided with a layer of pressure sensitive adhesive to simplify its installation.

In accordance with another specific aspect of the invention, the polyvinyl fluoride film layer of the new material can be reverse printed on its nonexposed surface with a grid or other pattern which acts as a guide for writing on the polyvinyl fluoride surface. Advantageously, the grid pattern is faintly printed so that it is invisible when viewed from more than a few feet from the writing surface. The faint printing of the grid pattern provides the desired writting guidelines, yet does not act as a distraction to an audience or interfere with the travel of the writing implement over the surface.

DESCRIPTION OF PREFERRED EMBODIMENTS

In a highly advantageous form, the universal display material of the invention consists of a laminate structure having three principle layers bonded together with conventional adhesives.

The outer layer of the preferred new material is a thin transparent polyvinyl fluoride film, as made available on the filing date hereof from the E. I. du Pont Chemical Company of Wilmington, Del., under the trademark Tedlar. Advantageously, the polyvinyl fluoride film should be approximately ½ to 2 mils thick.

As a specific aspect of the invention, horizontal and/or vertical lines for guiding a writer are provided when the new material is used in place of a conventional slate "blackboard," for example. To accomplish this, a grid pattern is typically printed on the nonexposed surface of the polyvinyl fluoride film. To prevent the grid pattern from distracting the audience or obscuring what is written on the writing surface, the pattern should be faintly printed so that it is visible only to the writer (i.e., 2 to 3 feet from the writing surface).

Bonded to the outer film of polyvinyl fluoride and forming an intermediate stratum of the preferred laminate of the invention, is a layer of a white laminating grade vinyl plastic. The vinyl plastic layer has a white or comparable light-colored pigmentation in order to enhance its contrasting properties for projection applications and is preferably from 4 to 15 mils in thickness.

The layer of the polyvinyl fluoride-vinyl plastic sub-lamination of the invention is bonded together with a suitable laminant chosen from the many available in the art, although an adhesive formulated from Du Pont number "49001" polyester resin and a polyisocyanate curing agent, such as the one available from E. I. du Pont Chemical Company under the designation "RC-805," has proven to be advantageous.

In accordance with the invention, the polyvinyl fluoride-vinyl sublamination of the invention is embossed in order to improve the optical properties and writing characteristics of the exposed polyvinyl fluoride surface. Most advantageously, the embossing pattern imparted to the exposed polyvvinyl fluoride surface of the new laminate is a regular and uniform pattern of hemispherical embossments on the film surface. The regular hemispherical embossments define a lenticular pattern on the writing-projection polyvinyl fluoride surface of the new material, eliminating so-called "hot spots" and providing a very advantageous writing and projection surface.

The polyvinyl fluoride-vinyl sub-lamination of the invention is provided with an iron or steel component for attracting and holding magnetized articles by joining the exposed vinyl surface with a thin, flexible steel foil by conventional laminating techniques. The bonding agent for effecting this combination may be any one of those known in the art for adhering vinyl plastics to steel foils. Alternatively, the new and improved material of the invention may be provided with a ferrous component for magnetic attraction by utilizing a vinyl plastic layer containing ferrous particles instead of the vinyl layer disclosed above. Such a material, known as Magnetic Vinyl, is available from the Goodyear Chemical Company.

In its end use as an "improved blackboard," for example, the polyvinyl fluoride-vinyl-steel foil laminated material of the invention is preferably mounted on a stiff particle board substrate to impart rigidity. Advantageously, to simplify the joining of the new and improved graphic display material of the invention to a rigid substrate, the mounting surface thereof may be provided with a coating of a suitable pressure sensitive adhesive. When so mounted, the new display-projection material is very suitable for installation on the walls of school classrooms and for other relatively permanent installations. When found necessary or desirable, such as in nonpermanent applications where easy mobility and convenient handling of the material are important, the new graphic display material of the invention may be used in its as-manufactured flexible condition.

The new material of the invention provides a unique combination of functions making it very advantageous for use in applications utilizing a variety of graphic techniques. In addition to providing an easily erased writing surface, the invention provides for embossing the display-projection surface of the new material to improve its optical and writing properties, as well as the printing of a faint grid pattern on the nonexposed surface of the transparent outer display surface, to provide writing guidelines. To permit the utilization of magnetic markers as an illustrative tool, the invention provides for an iron or steel component, usually in the form of steel foil, to be incorporated into the new and improved material.

The new material permits the same surface to be used for writing, projection, and with illustrative three dimensional markers. It is foreseen that the new material will find wide acceptance in the educational industry where graphic versatility is desired.

It should be understood that the specific examples described in the preceding paragraphs are meant to be illustrative only. Variations may be made without departing from the clear teachings of the disclosure. Accordingly, reference should be made to the following appended claims in ascertaining the full scope of the invention.

I claim:
1. A universal graphic display material comprising:
    (a) a laminating grade white vinyl stratum,
    (b) a transparent polyvinyl fluoride film layer having an exposed surface, and
    (c) a metal foil stratum bonded to one surface of said white vinyl stratum,
    (d) means bonding said polyvinyl fluoride film layer to the surface of said white vinyl stratum opposite said metal foil stratum,
    (e) said exposed surface of said polyvinyl fluoride film layer including lenticular embossments, whereby surface glare therefrom is substantially reduced and the optical and writing properties thereof are improved.
2. The display material of claim 1, wherein:
    (a) the unexposed surface of said polyvinyl fluoride film has a square grid pattern printed thereon,
    (b) said square grid pattern being of a predetermined intensity to render it substantially invisible when viewed from a distance greater than normal writing distance.
3. The display material of claim 1, wherein:
    (a) said embossments are arranged in a regular pattern and are individually hemispherically shaped.
4. The display material of claim 1, wherein:
    (a) said metal foil stratum is steel, whereby magnetized display pieces may be held thereto.
5. The display material of claim 1, wherein:
    (a) the exposed surface of said metal foil is coated with a layer of pressure sensitive adhesive.
6. A universal graphic display material, comprising:
    (a) a light-colored laminating grade vinyl stratum,
    (b) a ferrous component whereby magnetized display pieces will be retained on the surface of said material, and
    (c) a polyvinyl fluoride film layer bonded to a surface of said vinyl stratum,
    (d) said polyvinyl fluoride film layer having a roughened surface providing predetermined optical and writing characteristics thereto.
7. The display material of claim 6, wherein said roughened surface comprises a regular pattern of hemispherically shaped projections.
8. The display material of claim 7, wherein:
    (a) said ferrous component comprises a steel foil.
9. The display material of claim 7, wherein:
    (a) said vinyl stratum includes white pigmentation.
10. The display material of claim 7, wherein:
    (a) said polyvinyl fluoride film is reverse printed with a square grid pattern,
    (b) said square grid pattern being substantially invisible at a distance from the polyvinyl fluoride layer greater than normal writing distance.

References Cited

UNITED STATES PATENTS

| | | | |
|---|---|---|---|
| 1,887,872 | 11/1932 | Ernst | 350—167X |
| 3,133,854 | 5/1964 | Simms | 161—189 |
| 3,146,492 | 9/1964 | Lemelson | 161—6UX |
| 3,191,495 | 6/1965 | Miller | 350—128X |
| 3,456,373 | 7/1969 | Epton | 40—142X |
| 3,484,956 | 12/1969 | Nightingale | 161—3.5X |

JOHN T. GOOLKASIAN, Primary Examiner

R. A. KILLWORTH, Assistant Examiner

U.S. Cl. X.R.

35—66; 40—136; 161—3.5, 6, 116, 167, 189, 218; 350—128, 167

PO-1050
(5/69)

UNITED STATES PATENT OFFICE
CERTIFICATE OF CORRECTION

Patent No. 3,549,463            Dated December 22, 1970

Inventor(s) Everett Bryant Frech

It is certified that error appears in the above-identified patent and that said Letters Patent are hereby corrected as shown below:

Column 2, lines 38-39, "writ-ting" should read --writing--.
Column 4, lines 47, 49, and 51, "7" should read --6--.

Signed and sealed this 7th day of September 1971.

(SEAL)
Attest:

EDWARD M. FLETCHER, JR.                ROBERT GOTTSCHALK
Attesting Officer                      Acting Commissioner of Pate